(12) United States Patent  (10) Patent No.: US 8,922,934 B2
Lu et al.  (45) Date of Patent: Dec. 30, 2014

(54) SYSTEMS AND METHODS FOR TRANSITION BASED EQUALIZATION

(71) Applicant: LSI Corporation, San Jose, CA (US)

(72) Inventors: Jin Lu, Lafayette, CO (US); Shaohua Yang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/912,159

(22) Filed: Jun. 6, 2013

(65) Prior Publication Data

US 2014/0268390 A1 Sep. 18, 2014

Related U.S. Application Data

(60) Provisional application No. 61/799,442, filed on Mar. 15, 2013.

(51) Int. Cl.
*G11B 5/035* (2006.01)
*G11B 5/00* (2006.01)
*G11B 5/09* (2006.01)
*H03H 7/30* (2006.01)
*H03H 7/40* (2006.01)
*H03K 5/159* (2006.01)
*G11B 20/10* (2006.01)
*H04L 27/01* (2006.01)

(52) U.S. Cl.
CPC .......... *H04L 27/01* (2013.01); *G11B 20/10037* (2013.01)
USPC ................................ 360/65; 360/32; 375/232

(58) Field of Classification Search
None
See application file for complete search history.

(56) References Cited

U.S. PATENT DOCUMENTS

| | | | |
|---|---|---|---|
| 6,535,553 B1 | 3/2003 | Limberg et al. | |
| 7,248,630 B2 | 7/2007 | Modrie et al. | |
| 7,257,764 B2 | 8/2007 | Suzuki et al. | |
| 7,421,017 B2 | 9/2008 | Takatsu | |
| 7,502,189 B2 | 3/2009 | Sawaguchi et al. | |
| 7,715,471 B2 | 5/2010 | Werner | |
| 8,018,360 B2 | 9/2011 | Nayak | |
| 8,046,666 B2 | 10/2011 | Park et al. | |
| 8,208,213 B2 | 6/2012 | Liu | |
| 2006/0123285 A1 | 6/2006 | De Araujo et al. | |
| 2009/0002862 A1 | 1/2009 | Park et al. | |
| 2010/0067621 A1 | 3/2010 | Noeldner et al. | |
| 2011/0072335 A1 | 3/2011 | Liu et al. | |
| 2011/0075569 A1 | 3/2011 | Marrow et al. | |
| 2011/0164332 A1 | 7/2011 | Cao | |
| 2011/0167227 A1 | 7/2011 | Yang et al. | |
| 2012/0019946 A1 | 1/2012 | Aravind | |
| 2012/0056612 A1 | 3/2012 | Mathew et al. | |
| 2012/0069891 A1 | 3/2012 | Zhang et al. | |
| 2012/0124119 A1 | 5/2012 | Yang | |
| 2012/0236430 A1 | 9/2012 | Tan et al. | |
| 2013/0054664 A1 | 2/2013 | Chang et al. | |
| 2013/0243070 A1* | 9/2013 | Ito et al. ...................... | 375/233 |
| 2013/0332790 A1* | 12/2013 | Lu et al. ...................... | 714/752 |

OTHER PUBLICATIONS

U.S. Appl. No. 13/777,915, filed Feb. 26, 2013, Jun Xiao, Unpublished.
U.S. Appl. No. 13/597,046, filed Aug. 28, 2012, Lu Pan, Unpublished.

(Continued)

*Primary Examiner* — Regina N Holder

(74) *Attorney, Agent, or Firm* — Hamilton DeSanctis & Cha

(57) ABSTRACT

Systems, methods, devices, circuits for transition based equalization.

20 Claims, 5 Drawing Sheets

(56) References Cited

OTHER PUBLICATIONS

U.S. Appl. No. 13/562,140, filed Jul. 30, 2012, Haotian Zhang, Unpublished.

U.S. Appl. No. 13/742,336, filed Jan. 15, 2013, Jianzhong Huang, Unpublished.

U.S. Appl. No. 13/551,507, filed Jul. 17, 2012, Ming Jin, Unpublished.

U.S. Appl. No. 13/545,784, filed Jul. 10, 2012, Yu Liao, Unpublished.

U.S. Appl. No. 13/525,188, filed Jun. 15, 2012, Yang Han, Unpublished.

U.S. Appl. No. 13/525,182, filed Jun. 15, 2012, Yang Han, Unpublished.

U.S. Appl. No. 13/346,556, filed Jan. 9, 2012, Haitao Xia, Unpublished.

U.S. Appl. No. 13/272,209, filed Oct. 12, 2011, Yu Liao, Unpublished.

U.S. Appl. No. 13/239,719, filed Sep. 22, 2011, Haitao Xia, Unpublished.

U.S. Appl. No. 13/491,062, filed Jun. 7, 2012, Jin Lu, Unpublished.

* cited by examiner

SYSTEMS AND METHODS FOR TRANSITION BASED EQUALIZATION

CROSS REFERENCE TO RELATED APPLICATIONS

The present application claims priority to (is a non-provisional of) U.S. Pat. App. No. 61/799,442, entitled "Systems and Methods for Transition Based Equalization", and filed Mar. 15, 2013 by Lu et al, the entirety of which is incorporated herein by reference for all purposes.

FIELD OF THE INVENTION

Various embodiments of the present invention provide systems and methods for data processing, and more particularly systems and methods for transition based equalization.

BACKGROUND

Various data processing systems have been developed including storage systems, cellular telephone systems, and radio transmission systems. In such systems data is transferred from a sender to a receiver via some medium. For example, in a storage system, data is sent from a sender (i.e., a write function) to a receiver (i.e., a read function) via a storage medium. As information is stored and transmitted in the form of digital data, errors are introduced that, if not corrected, can corrupt the data and render the information unusable. The effectiveness of any transfer is impacted by any losses in data caused by various factors. For example, as the recording density of magnetic disk drives increases, the noise, jitter and distortion increases, making it more difficult to recover the original data.

SUMMARY

Various embodiments of the present invention provide systems and methods for data processing, and more particularly systems and methods for transition based equalization.

A data processing system is disclosed including at least one equalizer circuit operable to equalize data according to a control parameter input, and a transition state detection circuit operable to detect whether each pair of bits in the data contains a transition and to select among a plurality of control parameters for the control parameter input. The plurality of control parameters are adapted to different operating characteristics.

This summary provides only a general outline of some embodiments of the invention. The phrases "in one embodiment," "according to one embodiment," "in various embodiments", "in one or more embodiments", "in particular embodiments" and the like generally mean the particular feature, structure, or characteristic following the phrase is included in at least one embodiment of the present invention, and may be included in more than one embodiment of the present invention. Importantly, such phrases do not necessarily refer to the same embodiment. This summary provides only a general outline of some embodiments of the invention. Additional embodiments are disclosed in the following detailed description, the appended claims and the accompanying drawings.

BRIEF DESCRIPTION OF THE FIGURES

A further understanding of the various embodiments of the present invention may be realized by reference to the figures which are described in remaining portions of the specification. In the figures, like reference numerals may be used throughout several drawings to refer to similar components. In the figures, like reference numerals are used throughout several figures to refer to similar components.

DETAILED DESCRIPTION OF THE INVENTION

Various embodiments of the present invention provide data processing systems with transition based equalization. The data processing systems include a digital finite impulse response (DFIR) filter that is controlled with transition based tap coefficients to equalize digital samples from an analog to digital converter. This compensates for inter-symbol interference resulting from data being transmitted at high speed through band-limited channels.

Data received by the data processing system is analyzed in bitwise fashion to determine whether the data transitions or changes, and the tap coefficients for the digital finite impulse response filter are selected accordingly. When two adjacent bits are (0,1) or (1,0), a transition has occurred and tap coefficients are selected that are appropriate for a relatively high frequency signal to allow for the high frequency components when the signal transitions. When two adjacent bits are (0,0) or (1,1), no transition has occurred and tap coefficients are selected that are appropriate for a relatively low frequency signal, providing better filtering where no valid high frequency components should exist in the signal. This differentiation of equalization schemes better reflects the signal characteristics of the data signal. By selecting tap coefficients for the digital finite impulse response filter based on the transition status, the equalization process is better able to suppress noise, jitter and distortion, enabling the data processing system to better detect the correct values of the retrieved data.

In some embodiments, the data processing system processes data that is retrieved from a magnetic storage medium such as a hard disk. User data is encoded, often with multiple encoding algorithms, before being stored on the magnetic storage medium in a non-return to zero (NRZ) format. In such embodiments, the transition based equalization selects the tap coefficients based on the transition status of the non-return to zero data that is retrieved from the magnetic storage medium.

Figure 1:
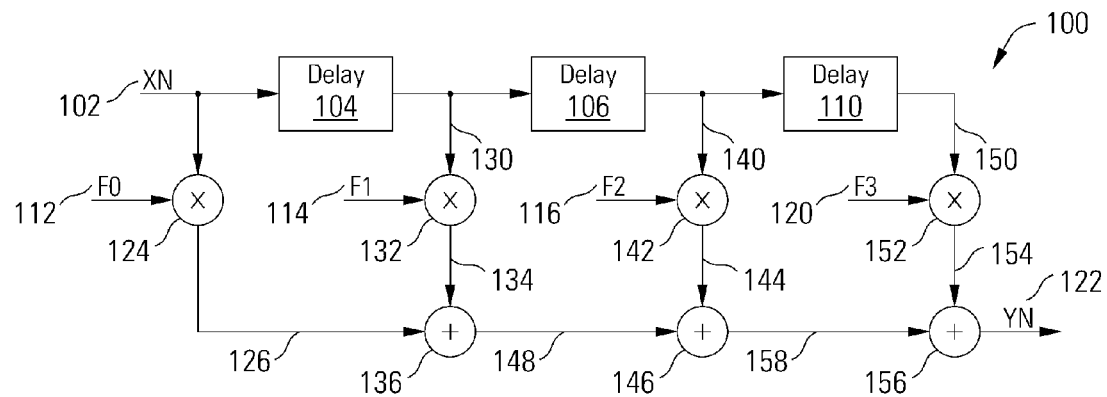
FIG. 1 depicts a digital finite impulse response (DFIR) filter that is controlled with transition based tap coefficients in accordance with one or more embodiments of the present invention.

Turning to FIG. 1, a digital finite impulse response filter 100 is depicted that is controlled with transition based tap coefficients in accordance with one or more embodiments of the present invention. The digital finite impulse response filter 100 passes an input 102 through a series of delay elements 104, 106 and 110, multiplying the delayed signals by filter coefficients or tap weights 112, 114, 116 and 120, and summing the results to yield a filtered output 122. The outputs 130, 140 and 150 of each delay element 104, 106 and 110 and the input 102 form a tapped delay line and are referred to as taps. The number of delay elements 104, 106 and 110, and thus the number of taps 102, 130, 140 and 150 (also referred to as the order or length of the DFIR filter 100) may be increased to more finely tune the frequency response, but at the cost of increasing complexity. The DFIR filter 100 implements a filtering equation such as $Y[n]=F0X[n]+F1X[n-1]+F2X[n-2]+F3X[n-3]$ for the three-delay filter illustrated in FIG. 1, or more generally $Y[n]=F0X[n]+F1X[n-1]+F2X[n-2]+ \ldots +FLX[n-L]$, where $X[n]$ is the current input 102, the value subtracted from n represents the index or delay applied to each term, Fi are the tap weights 112, 114, 116 and 120, $Y[n]$ is the output 122 and L is the filter order. The input 102 is multiplied by tap weight 112 in a multiplier 124, yielding a first output term 126. The second tap 130 is multiplied by tap weight 114 in multiplier 132, yielding a second output term 134, which is combined with first output term 126 in an adder 136 to yield a first sum 148. The third tap 140 is multiplied by tap weight 116 in multiplier 142, yielding a third output term 144, which is combined with first sum 148 in adder 146 to yield a second sum 158. The fourth tap 150 is multiplied by tap weight 120 in multiplier 152, yielding a fourth output term 154, which is combined with second sum 158 in adder 156 to yield output 122. By changing the tap weights 112, 114, 116 and 120, the filtering applied to the input 102 by the DFIR filter 100 is adjusted to select the desired pass frequencies and stop frequencies. The transition based equalization is not limited to any particular filter circuit, and based upon the disclosure provided herein, one of ordinary skill in the art will recognize a variety of filter circuits that may be used with transition based training.

Figure 2:
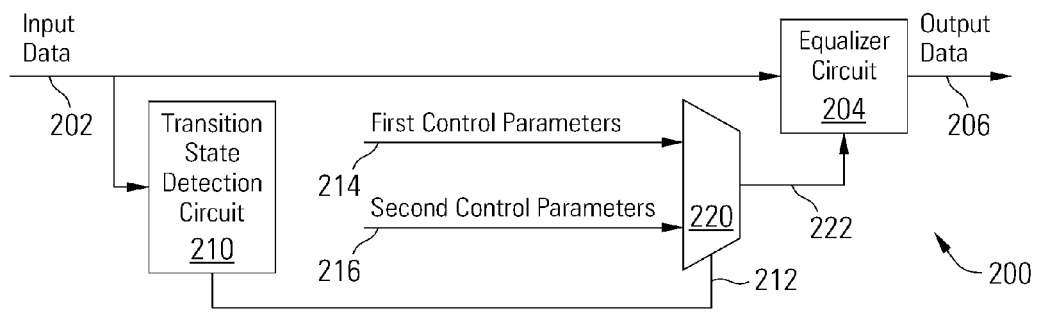
FIG. 2 depicts a block diagram of a data processing system with transition based equalization in accordance with one or more embodiments of the present invention.

Turning to FIG. 2, a data processing system with transition based equalization 200 is depicted in accordance with one or more embodiments of the present invention. Input data 202 is received to be processed in an equalizer circuit 204. Input data 202 is a digital data stream which may be derived, for example, from a read/write head assembly in a magnetic storage medium and an analog to digital converter. In other cases, input data 202 is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which input data 202 may be derived.

Equalizer circuit 204 applies an equalization algorithm to input data 202 to yield an equalized output 206. In some embodiments of the present invention, equalizer circuit 204 is a digital finite impulse response filter circuit as is known in the art. The equalization algorithm applied to input data 202 by equalizer circuit 204 is controlled by equalizer coefficients 222, which are adjusted or varied based on the transition state of the input data 202. When the equalizer circuit 204 is processing a pair of bits that transition, e.g., 01 or 10, the equalizer coefficients 222 are customized to prepare the equalizer circuit 204 for a relatively high frequency signal. When the equalizer circuit 204 is processing a pair of bits that do not transition, e.g., 00 or 11, the equalizer coefficients 222 are customized to prepare the equalizer circuit 204 for a relatively low frequency signal.

A transition state detection circuit 210 analyzes the input data 202 to determine whether the pair of bits to be processed by the equalizer circuit 204 contain a transition or not, yielding an output 212 that selects between first control parameters 214 and second control parameters 216. In some embodiments, the first control parameters 214 and second control parameters 216 are tap coefficients for a digital finite impulse response filter circuit, with one trained with low frequency data and the other trained with high frequency data. A switch 220 controlled by output 212 from the transition state detection circuit 210 provides the selected equalizer coefficients 222 to the equalizer circuit 204.

The first control parameters 214 and second control parameters 216 are obtained using any suitable manner, including but not limited to using a training process or design calculations. In some training embodiments, known inputs are provided to an equalizer circuit (e.g., 204) while adjusting the tap weights (e.g., equalizer coefficients 222) to achieve the desired filtered output corresponding to the known inputs. In some calculation embodiments, the tap weights are calculated by determining the desired frequency response that stops unwanted frequencies and passes the wanted frequencies, then calculating the inverse Fourier transform of the desired frequency response, and using the results as the tap weights. In both sets of embodiments, the first control parameters 214 and second control parameters 216 are obtained in separate operations using training data or frequency inputs to the calculation that are tailored to different transition states, one targeted at data with transitions and the other targeted at data without transitions. Based upon the disclosure provided herein, one of ordinary skill in the art will recognize a variety of manners in which equalizer coefficients or tap coefficients may be generated.

Figure 3:
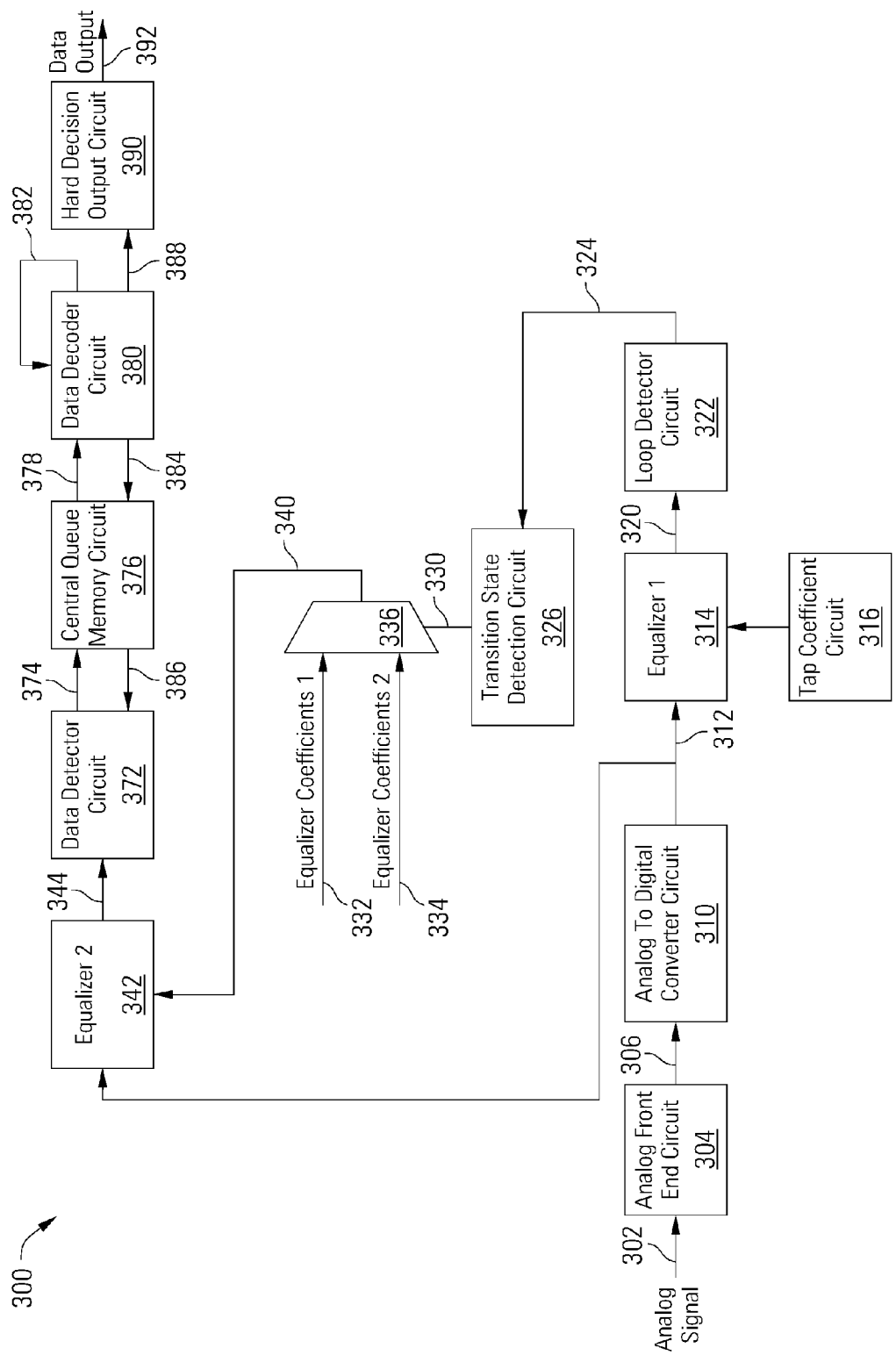
FIG. 3 depicts a block diagram of a data processing system with transition based equalization controlled by a loop equalizer and loop detector output in accordance with one or more embodiments of the present invention.

Turning to FIG. 3, a data processing system such as a read channel 300 with transition based equalization is depicted in accordance with one or more embodiments of the present invention. The read channel 300 is used to process analog signal 302 and to retrieve user data bits from the analog signal 302 without errors. In some cases, analog signal 302 is derived from a read/write head assembly in a magnetic storage medium. In other cases, analog signal 302 is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which analog signal 302 may be derived.

The read channel 300 includes an analog front end 304 that receives and processes the analog signal 302. Analog front end 304 may include, but is not limited to, an analog filter and an amplifier circuit as are known in the art. Based upon the disclosure provided herein, one of ordinary skill in the art will recognize a variety of circuitry that may be included as part of analog front end 304. In some cases, the gain of a variable gain amplifier included as part of analog front end 304 may be modifiable, and the cutoff frequency and boost of an analog filter included in analog front end 304 may be modifiable. Analog front end 304 receives and processes the analog signal 302, and provides a processed analog signal 306 to an analog to digital converter 310.

Analog to digital converter 310 converts processed analog signal 306 into a corresponding series of digital samples 312. Analog to digital converter 310 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 312 are provided to an equalizer 314. Equalizer 314 applies an equalization algorithm to digital samples 312 to yield an equalized output 320. In some embodiments of the present invention, equalizer 314 is a digital finite impulse response filter circuit as is known in the art.

A tap coefficient circuit 316 provides tap coefficients for equalizer 314, which are generally adapted to the overall channel conditions of the read channel 300 and the analog signal 302. Notably, in some embodiments, the tap coefficients from equalized output 316 are not adapted to the transition state to keep latency low in a front end or loop portion of the read channel 300. Based upon the disclosure provided herein, one of ordinary skill in the art will recognize a variety of manners in which equalizer coefficients or tap coefficients may be generated.

A data detector 322 performs a data detection process on the equalized output 320, resulting in a detected output 324. In some embodiments of the present invention, data detector 322 is a Viterbi algorithm data detector circuit, or more particularly in some cases, a maximum a posteriori (MAP) data detector circuit as is known in the art. In some of these embodiments, the detected output 324 contains log likelihood ratio soft information about the likelihood that each bit or symbol has a particular value. In some embodiments, data detector 322 contains a hard decision representing the most likely value of each bit or symbol. In some embodiments, data detector 322 contains both soft information and hard decisions. Based upon the disclosure provided herein, one of ordinary skill in the art will recognize a variety of data detectors that may be used in relation to different embodiments of the present invention.

The detected output 324 from data detector 322 is provided to a transition state detection circuit 326, which determines whether the current pair of bits contains a transition or not. In some embodiments, the transition state detection circuit 326 operates on soft information from the data detector 322, calculating the likelihood that the current pair of bits contains a transition. In other embodiments, the transition state detection circuit 326 operates on hard decisions from the data detector 322 to determine whether the current pair of bits contains a transition. Based upon the output 330 of the transition state detection circuit 326, a multiplexer or switch 336 selects either first equalizer coefficients 332 or second equalizer coefficients 334, one being adapted to data with a transition and the other being adapted to data without a transition. The output of the switch 336 is used as the tap coefficients 340 to an equalizer 342. If the transition state detection circuit 326 determines that the current pair of bits contain a transition, the equalizer coefficients 332 or 334 that are adapted to data with a transition are selected.

Equalizer 342 applies an equalization algorithm to digital samples 312 to yield an equalized output 344, with the operation of the equalization algorithm controlled by the tap coefficients 340, performing transition based equalization. In some embodiments of the present invention, equalizer 342 is a digital finite impulse response filter circuit as is known in the art. Because the equalizer 342 performs transition based equalization, it has an improved ability to reduce equalization errors and suppress channel noise and distortion, thereby achieving performance gain at downstream processing devices such as a data detector circuit 372 and data decoder circuit 380.

The equalized output 344 from equalizer 342 is provided to data detector circuit 372 which yields detected output 374. Data detector circuit 372 is a data detector circuit capable of producing detected output 374 by applying a data detection algorithm. In some embodiments, the data detection algorithm may be but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 372 may provide both hard decisions and soft decisions.

Detected output 374 is provided to a central queue memory circuit 376 that operates to buffer data passed between data detector circuit 372 and data decoder circuit 380. When data decoder circuit 380 is available, data decoder circuit 380 receives detected output 374 from central queue memory 376 as a decoder input 378. Data decoder circuit 380 applies a data decoding algorithm to decoder input 378 in an attempt to recover originally written data. The result of the data decoding algorithm is provided as a decoded output 384. Similar to detected output 374, decoded output 384 may include both hard decisions and soft decisions. Data decoder circuit 380 may be any data decoder circuit known in the art that is capable of applying a decoding algorithm to a received input. Data decoder circuit 380 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 380 provides the result of the data decoding algorithm as a data output 388. Data output 388 is provided to a hard decision output circuit 390 where the data is reordered before providing a series of ordered data sets as a data output 392.

One or more iterations through the combination of data detector circuit 372 and data decoder circuit 380 may be made in an effort to converge on the originally written data set. Processing through both the data detector circuit 372 and the data decoder circuit 380 is referred to as a "global iteration". For the first global iteration, data detector circuit 372 applies the data detection algorithm without guidance from a decoded output. For subsequent global iterations, data detector circuit 372 applies the data detection algorithm to equalized output 344 as guided by decoded output 384. Decoded output 384 is received from central queue memory 376 as a detector input 386.

During each global iteration it is possible for data decoder circuit 380 to make one or more local iterations including application of the data decoding algorithm to decoder input 378. For the first local iteration, data decoder circuit 380 applies the data decoder algorithm without guidance from a decoded output 382. For subsequent local iterations, data decoder circuit 380 applies the data decoding algorithm to decoder input 378 as guided by a previous decoded output 382.

In this embodiment, one equalizer 342 is used for both transition and non-transition periods with the appropriate tap coefficients 332 or 334 being selected based on the detected output 324. This saves circuit space by time multiplexing the tap coefficients 332, 334 so that only the booth encoding of the tap coefficients 332 or 334 is doubled.

Figure 4:
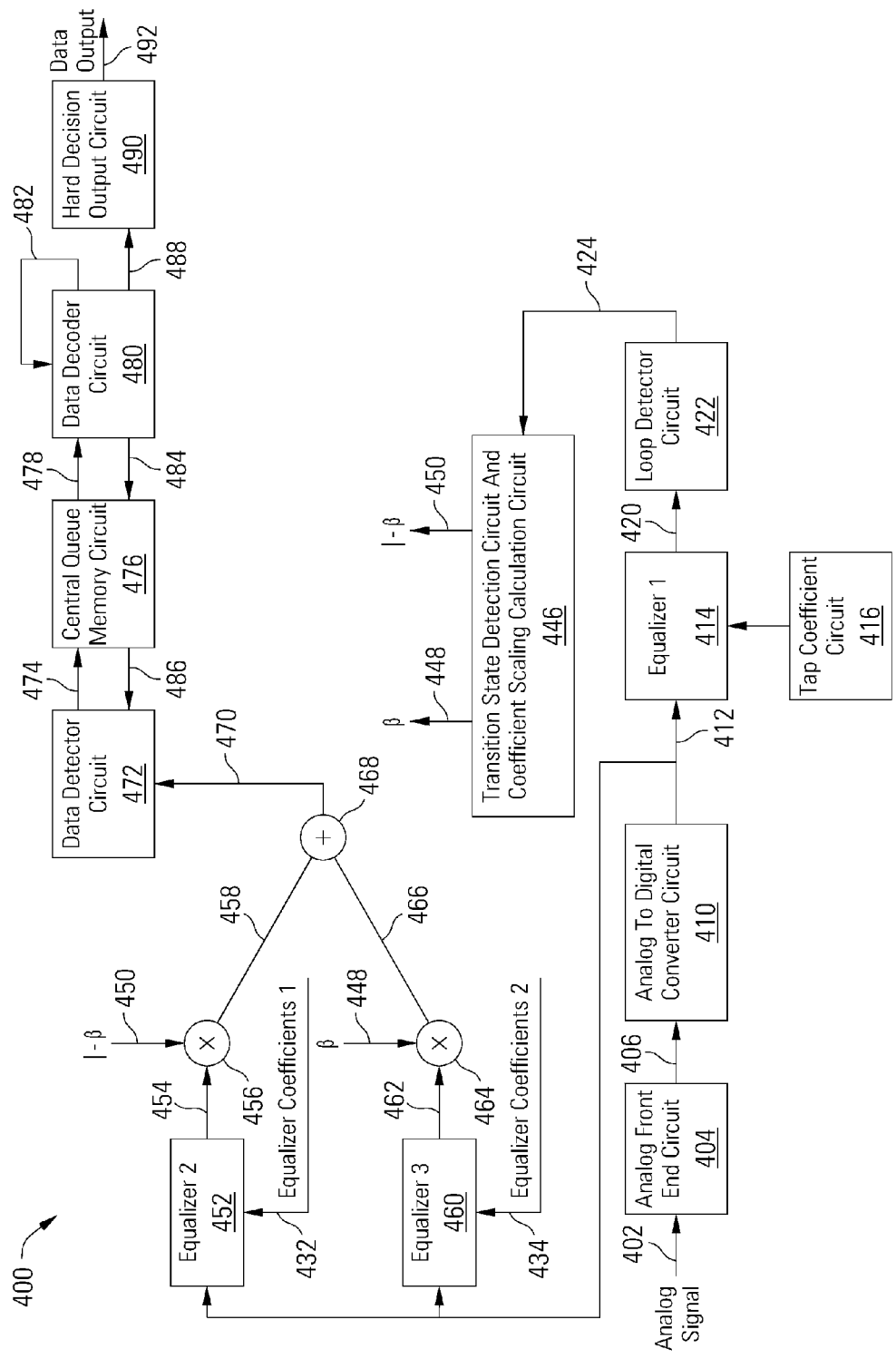
FIG. 4 depicts a block diagram of a data processing system with transition based equalization controlled by a loop equalizer and loop detector output, using multiple equalizers with scaled outputs in accordance with one or more embodiments of the present invention.

Turning to FIG. 4, data processing system such as a read channel 400 is depicted in accordance with one or more embodiments of the present invention, in which equalized outputs 454, 462 from multiple equalizer circuits 452, 460 are scaled to perform transition based equalization. The read channel 400 is used to process analog signal 402 and to retrieve user data bits from the analog signal 402 without errors. In some cases, analog signal 402 is derived from a read/write head assembly in a magnetic storage medium. In other cases, analog signal 402 is derived from a receiver circuit that is operable to receive a signal from a transmission medium. The transmission medium may be wireless or wired such as, but not limited to, cable or optical connectivity. Based upon the disclosure provided herein, one of ordinary skill in the art will recognize a variety of sources from which analog signal 402 may be derived.

The read channel 400 includes an analog front end 404 that receives and processes the analog signal 402. Analog front end 404 may include, but is not limited to, an analog filter and an amplifier circuit as are known in the art. Based upon the disclosure provided herein, one of ordinary skill in the art will recognize a variety of circuitry that may be included as part of analog front end 404. In some cases, the gain of a variable gain amplifier included as part of analog front end 404 may be modifiable, and the cutoff frequency and boost of an analog filter included in analog front end 404 may be modifiable. Analog front end 404 receives and processes the analog signal 402, and provides a processed analog signal 406 to an analog to digital converter 410.

Analog to digital converter 410 converts processed analog signal 406 into a corresponding series of digital samples 412. Analog to digital converter 410 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 412 are provided to an equalizer 414. Equalizer 414 applies an equalization algorithm to digital samples 412 to yield an equalized output 420. In some embodiments of the present invention, equalizer 414 is a digital finite impulse response filter circuit as is known in the art.

A tap coefficient circuit 416 provides tap coefficients for equalizer 414, which are generally adapted to the overall channel conditions of the read channel 400 and the analog signal 402. Notably, in some embodiments, the tap coefficients from equalized output 416 are not adapted to the transition state to keep latency low in a front end or loop portion of the read channel 400. Based upon the disclosure provided herein, one of ordinary skill in the art will recognize a variety of manners in which equalizer coefficients or tap coefficients may be generated.

A data detector 422 performs a data detection process on the equalized output 420, resulting in a detected output 424. In some embodiments of the present invention, data detector 422 is a Viterbi algorithm data detector circuit, or more particularly in some cases, a maximum a posteriori (MAP) data detector circuit as is known in the art. In some of these embodiments, the detected output 424 contains log likelihood ratio soft information about the likelihood that each bit or symbol has a particular value. In some embodiments, data detector 422 contains a hard decision representing the most likely value of each bit or symbol. In some embodiments, data detector 422 contains both soft information and hard decisions. Based upon the disclosure provided herein, one of ordinary skill in the art will recognize a variety of data detectors that may be used in relation to different embodiments of the present invention.

The detected output 424 from data detector 422 is provided to a transition state detection and coefficient scaling calculation circuit 446, which determines whether the current pair of bits contains a transition or not and which calculates scaling factors 448, 450 based on whether the current pair of bits contains a transition or not. In some embodiments, the transition state detection and coefficient scaling calculation circuit 446 operates on soft information from the data detector 422, calculating the likelihood that the current pair of bits contains a transition. In other embodiments, the transition state detection and coefficient scaling calculation circuit 446 operates on hard decisions from the data detector 422 to determine whether the current pair of bits contains a transition.

A pair of equalizer circuits 452, 460 each apply an equalization algorithm to digital samples 412 to yield an equalized outputs 454, 462. One of the equalizer circuits 452 is controlled by tap coefficients 432 adapted to data with a transition, the other of the equalizer circuits 460 is controlled by tap coefficients 434 adapted to data without a transition. The tap coefficients 432 and 434 are adapted in some embodiments during a calibration process using a least mean squared adaptation algorithm based on detector soft output 424, in one case using known data with transitions and in the other using known data without transitions. The equalized output 454, for which equalization is tailored to data with a transition, is scaled by a scaling factor $(1-\beta)$ 450 in multiplier 456 to yield scaled equalized output 458. The equalized output 462, for which equalization is tailored to data without a transition, is scaled by a scaling factor $\beta$ 448 in multiplier 464 to yield scaled equalized output 466. Scaling factor $\beta$ 448 is a value ranging from 0 to 1, with larger values when the transition state detection and coefficient scaling calculation circuit 446 determines that the current pair of bits does not have a transition. Scaling factor $(1-\beta)$ 450 is a value ranging from 0 to 1, with larger values when the transition state detection and coefficient scaling calculation circuit 446 determines that the current pair of bits have a transition. The scaled equalized outputs 458 and 466 are combined in adder 468, yielding transition based equalized output 470. Based upon the disclosure provided herein, one of ordinary skill in the art will recognize a variety of circuits that may be used to generate equalized outputs using different equalizer coefficients 432, 434 and to scale and combine the result to yield a transition based equalized output.

In some embodiments, where $p(x_k=1)=m$, $p(x_{k-1}=1)=n$ are the probabilities derived from the soft information in detected output 424, and where $x_k$ and $x_{k-1}$ are two consecutive bits, the probability of having a transition can be estimated as $m \cdot (1-n) + n \cdot (1-m)$. This probability is used to mix the outputs of equalizer circuits 452, 460 to perform transition based equalization.

In some embodiments, the equalizer coefficients 432 and 434 are trained using the detected output 424, based on the probability P(non-transition) that the current pair of bits do not have a transition and the probability P(transition) that the current pair of bits do have a transition. Defining $\beta_k$ as P(non-transition) at time instant k, transition_coefficient1[k]+=$\beta_k$* $\mu$*X*err_adapt and transition_coefficient2[k]+=$(1\beta_k)$ *$\mu$*X*err_adapt, where transition_coefficient2[k] are the first equalizer coefficients 432, transition_coefficient1[k] are the second equalizer coefficients 434, $\mu$ is the learning rate, such as but not limited to 1e-6, X is the corresponding X sample from the analog to digital converter 410, and err_adapt=ideal_val-$\beta_k$*Y$_1$[k]-(1-$\beta_k$)*Y$_2$[k].

The equalized output 470 is provided to data detector circuit 472 which yields detected output 474. Data detector circuit 472 is a data detector circuit capable of producing detected output 474 by applying a data detection algorithm. In some embodiments, the data detection algorithm may be but is not limited to, a soft output Viterbi algorithm (SOVA), or a maximum a posteriori detection algorithm as are known in the art. Based upon the disclosure provided herein, one of ordinary skill in the art will recognize a variety of data detection algorithms that may be used in relation to different embodiments of the present invention. Data detector circuit 472 may provide both hard decisions and soft decisions.

Detected output 474 is provided to a central queue memory circuit 476 that operates to buffer data passed between data detector circuit 472 and data decoder circuit 480. When data decoder circuit 480 is available, data decoder circuit 480 receives detected output 474 from central queue memory 476 as a decoder input 478. Data decoder circuit 480 applies a data decoding algorithm to decoder input 478 in an attempt to recover originally written data. The result of the data decoding algorithm is provided as a decoded output 484. Similar to detected output 474, decoded output 484 may include both hard decisions and soft decisions. Data decoder circuit 480 may be any data decoder circuit known in the art that is capable of applying a decoding algorithm to a received input. Data decoder circuit 480 may be, but is not limited to, a low density parity check decoder circuit or a Reed Solomon decoder circuit as are known in the art. Based upon the disclosure provided herein, one of ordinary skill in the art will recognize a variety of data decoder circuits that may be used in relation to different embodiments of the present invention. Where the original data is recovered (i.e., the data decoding algorithm converges) or a timeout condition occurs, data decoder circuit 480 provides the result of the data decoding algorithm as a data output 488. Data output 488 is provided to a hard decision output circuit 490 where the data is reordered before providing a series of ordered data sets as a data output 492.

One or more iterations through the combination of data detector circuit 472 and data decoder circuit 480 may be made in an effort to converge on the originally written data set. Processing through both the data detector circuit 472 and the data decoder circuit 480 is referred to as a "global iteration". For the first global iteration, data detector circuit 472 applies the data detection algorithm without guidance from a decoded output. For subsequent global iterations, data detector circuit 472 applies the data detection algorithm to equalized output 470 as guided by decoded output 484. Decoded output 484 is received from central queue memory 476 as a detector input 486.

During each global iteration it is possible for data decoder circuit 480 to make one or more local iterations including application of the data decoding algorithm to decoder input 478. For the first local iteration, data decoder circuit 480 applies the data decoder algorithm without guidance from a decoded output 482. For subsequent local iterations, data decoder circuit 480 applies the data decoding algorithm to decoder input 478 as guided by a previous decoded output 482.

Figure 5:
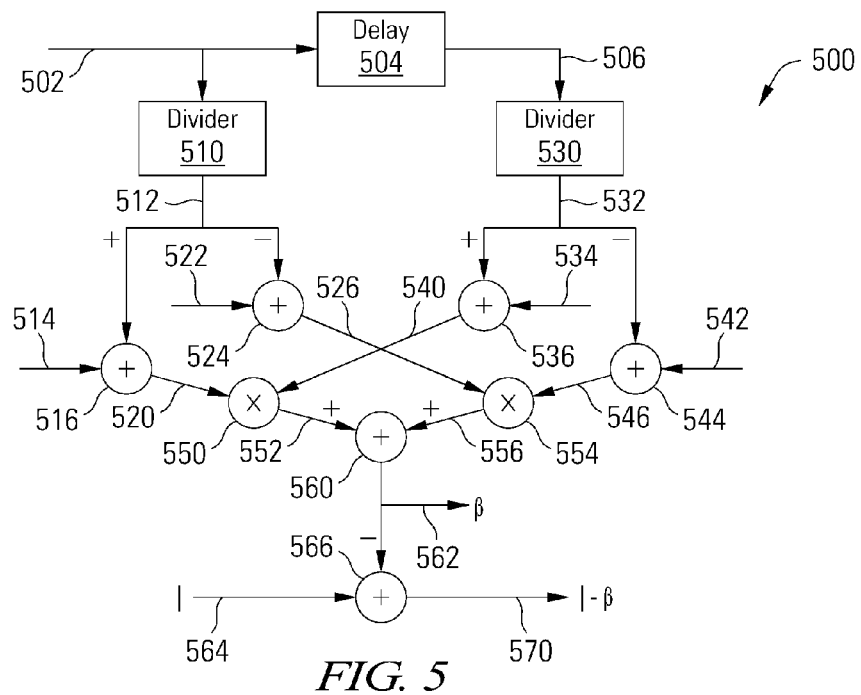
FIG. 5 depicts a block diagram of an equalizer coefficient scaling calculation circuit in accordance with one or more embodiments of the present invention.

Turning to FIG. 5, an equalizer coefficient scaling calculation circuit 500, suitable for use in some embodiments in transition state detection and coefficient scaling calculation circuit 446 to calculate the scaling factors $\beta$ 448 and (1-$\beta$) 450, is depicted in accordance with one or more embodiments of the present invention. Input 502 contains digital samples such as but not limited to Y samples from a loop detector circuit output 324 or 424. The two Y samples Y' [k] (with transition) and Y"[k] (non-transition) are combined by using the $\beta$[k] value to generate the new Y samples for the detector 472 and decoder 480, i.e., Y[k]=(1-$\beta$[k])·Y'[k]+$\beta$[k]·Y"[k]. The value of $\beta$ can be computed from the soft output in detected output 424 as follows: $\beta$=(softOut[k]/64+0.5)*(softOut[k-1]/64+0.5)+(0.5-softOut[k]/64)*(0.5-softOut[k-1]/64). The equalizer coefficient scaling calculation circuit 500 performs this calculation by providing detector soft decisions at input 502 to divider 510, which divides Y samples by 64 in some embodiments. The soft values are scaled by other values in some embodiments, such as but not limited to dividing by 32 instead of 64. The output 512 of divider 510 is added to value 514, which in some embodiments is 0.5, in adder 516 to yield sum 520. The output 512 of divider 510 is subtracted from value 522, which in some embodiments is 0.5, in adder 524 to yield difference 526. Y samples at input 502 are also provided to one-bit delay circuit 504, then to divider 530, which divides delayed detector soft decisions 506 by 64 in some embodiments. The output 532 of divider 530 is added to value 534, which in some embodiments is 0.5, in adder 536 to yield sum 540. The output 532 of divider 530 is subtracted from value 542, which in some embodiments is 0.5, in adder 544 to yield difference 546. Sums 520 and 540 are multiplied in multiplier 550 to yield product 552. Differences 526 and 546 are multiplied in multiplier 554 to yield product 556. Products 552 and 556 are added in adder 560 to yield scaling factor $\beta$ 562. Scaling factor $\beta$ 562 is subtracted from value 564, or 1.0, in adder 566 to yield scaling factor (1-$\beta$) 570.

The tap coefficient scaling factors are calculated in other manners in other embodiments, and one of ordinary skill in the art will recognize a variety of circuits and algorithms that may be used to generate scaling factors for transition based tap coefficient. For example, in some embodiments, the data detector (e.g., 422) is symbol-based rather than bit-based, yielding soft values that indicate the probability of each multi-bit symbol. In a 2-bit symbol data detector, the data detector provides the likelihood that each symbol has value 00, 01, or 11. By adding the symbol probabilities for values 01 and 10, the probability of transition is obtained, and by adding the symbol probabilities for values 00 and 11, the probability of non-transition is obtained.

Figure 6:
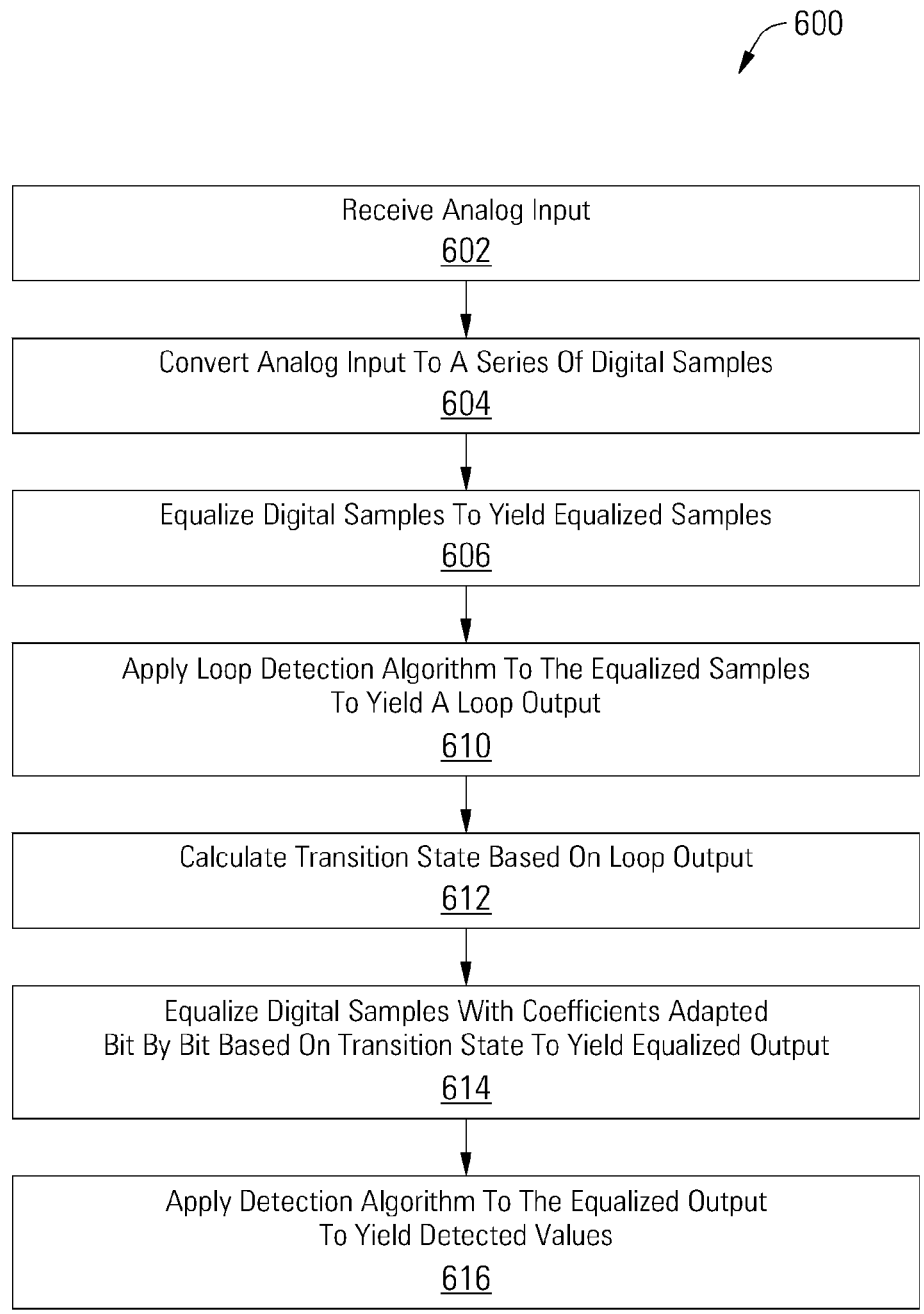
FIG. 6 depicts a flow diagram showing a method for data processing with transition based equalization in accordance with one or more embodiments of the present invention.

Turning now to FIG. 6, a flow diagram 600 depicts a method for data processing including transition based equalization in accordance with some embodiments of the present invention. The method of FIG. 6, or variations thereof, may be performed in data decoding circuits such as those illustrated in FIGS. 1-5. Following flow diagram 600, an analog input is received (block 602). The analog input is converted to a series of digital samples (block 604). The digital samples are equalized to yield equalized samples (block 606). A loop detection algorithm is applied to the equalized samples to yield a loop detector output (block 610). The transition state is calculated based on the loop detector output (block 612), identifying whether the current bit pair contains a transition or not. The digital samples are again equalized with coefficients adapted bit by bit based on the transition state to yield an equalized output (block 614). A detection algorithm is applied to the equalized output to yield detected values (block 616).

Figure 7:
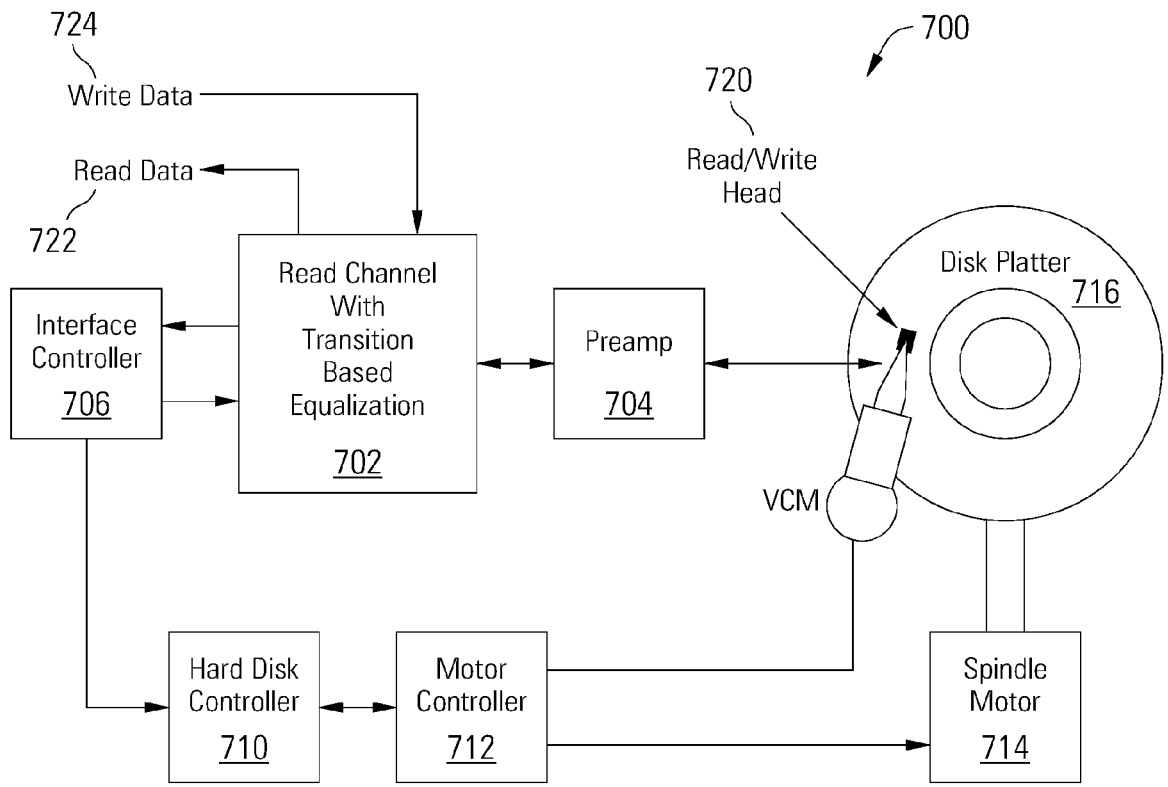
FIG. 7 depicts a storage system including a data processing system with transition based equalization in accordance with one or more embodiments of the present invention.

Turning to FIG. 7, a storage system 700 is illustrated as an example application of a data processing system with transition based equalization in accordance with some embodiments of the present invention. The storage system 700 includes a read channel circuit 702 with a data processing system with transition based equalization in accordance with some embodiments of the present invention. Storage system 700 may be, for example, a hard disk drive. Storage system 700 also includes a preamplifier 704, an interface controller 706, a hard disk controller 710, a motor controller 712, a spindle motor 714, a disk platter 716, and a read/write head assembly 720. Interface controller 706 controls addressing and timing of data to/from disk platter 716. The data on disk platter 716 consists of groups of magnetic signals that may be detected by read/write head assembly 720 when the assembly is properly positioned over disk platter 716. In one embodiment, disk platter 716 includes magnetic signals recorded in accordance with either a longitudinal or a perpendicular recording scheme.

In a typical read operation, read/write head assembly 720 is accurately positioned by motor controller 712 over a desired data track on disk platter 716. Motor controller 712 both positions read/write head assembly 720 in relation to disk platter 716 and drives spindle motor 714 by moving read/write head assembly 720 to the proper data track on disk platter 716 under the direction of hard disk controller 710. Spindle motor 714 spins disk platter 716 at a determined spin rate (RPMs). Once read/write head assembly 720 is positioned adjacent the proper data track, magnetic signals representing data on disk platter 716 are sensed by read/write head assembly 720 as disk platter 716 is rotated by spindle motor 714. The sensed magnetic signals are provided as a continuous, minute analog signal representative of the magnetic data on disk platter 716. This minute analog signal is transferred from read/write head assembly 720 to read channel circuit 702 via preamplifier 704. Preamplifier 704 is operable to amplify the minute analog signals accessed from disk platter 716. In turn, read channel circuit 702 decodes and digitizes the received analog signal to recreate the information originally written to disk platter 716. This data is provided as read data 722 to a receiving circuit. While processing the read data, read channel circuit 702 processes the received signal using a data processing system with transition based equalization. Such a data processing system with transition based equalization may be implemented consistent with the circuits and methods disclosed in FIGS. 1-6. A write operation is substantially the opposite of the preceding read operation with write data 724 being provided to read channel circuit 702. This data is then encoded and written to disk platter 716.

It should be noted that storage system 700 may be integrated into a larger storage system such as, for example, a RAID (redundant array of inexpensive disks or redundant array of independent disks) based storage system. Such a RAID storage system increases stability and reliability through redundancy, combining multiple disks as a logical unit. Data may be spread across a number of disks included in the RAID storage system according to a variety of algorithms and accessed by an operating system as if it were a single disk. For example, data may be mirrored to multiple disks in the RAID storage system, or may be sliced and distributed across multiple disks in a number of techniques. If a small number of disks in the RAID storage system fail or become unavailable, error correction techniques may be used to recreate the missing data based on the remaining portions of the data from the other disks in the RAID storage system. The disks in the RAID storage system may be, but are not limited to, individual storage systems such as storage system 700, and may be located in close proximity to each other or distributed more widely for increased security. In a write operation, write data is provided to a controller, which stores the write data across the disks, for example by mirroring or by striping the write data. In a read operation, the controller retrieves the data from the disks. The controller then yields the resulting read data as if the RAID storage system were a single disk.

Transition based equalization is applicable to transmission of information over virtually any channel or storage of information on virtually any media. Transmission applications include, but are not limited to, optical fiber, radio frequency channels, wired or wireless local area networks, digital subscriber line technologies, wireless cellular, Ethernet over any medium such as copper or optical fiber, cable channels such as cable television, and Earth-satellite communications. Storage applications include, but are not limited to, hard disk drives, compact disks, digital video disks, magnetic tapes and memory devices such as DRAM, NAND flash, NOR flash, other non-volatile memories and solid state drives.

In addition, it should be noted that storage system 700 may be modified to include solid state memory that is used to store data in addition to the storage offered by disk platter 716. This solid state memory may be used in parallel to disk platter 716 to provide additional storage. In such a case, the solid state memory receives and provides information directly to read channel circuit 702. Alternatively, the solid state memory may be used as a cache where it offers faster access time than that offered by disk platter 716. In such a case, the solid state memory may be disposed between interface controller 706 and read channel circuit 702 where it operates as a pass through to disk platter 716 when requested data is not available in the solid state memory or when the solid state memory does not have sufficient storage to hold a newly written data set. Based upon the disclosure provided herein, one of ordinary skill in the art will recognize a variety of storage systems including both disk platter 716 and a solid state memory.

Figure 8:
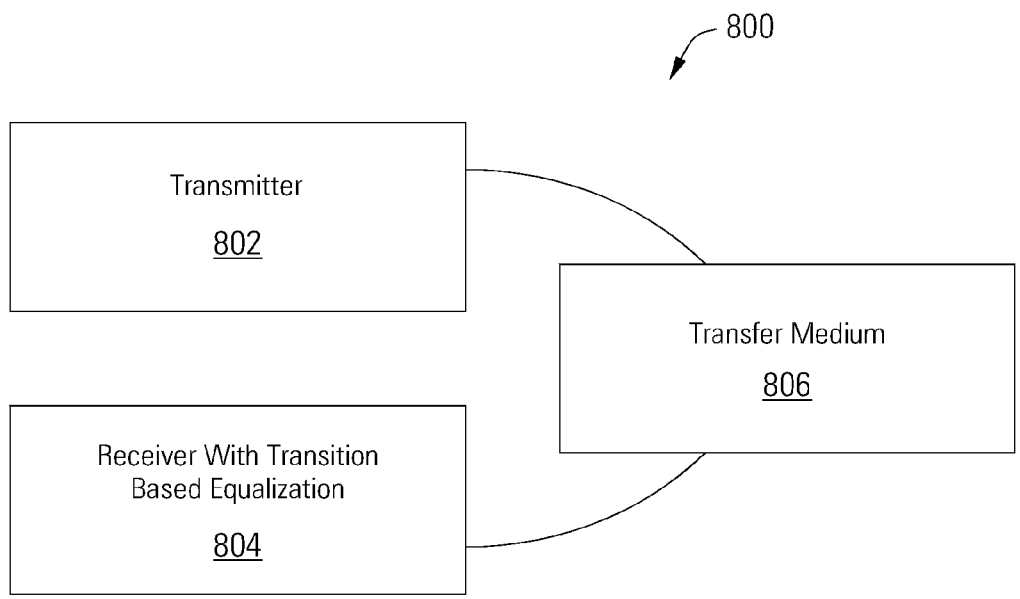
FIG. 8 depicts a wireless communication system including a data processing system with transition based equalization in accordance with one or more embodiments of the present invention.

Turning to FIG. 8, a wireless communication system 800 or data transmission device including a transmitter 802 with a data processing system with transition based equalization is shown in accordance with some embodiments of the present invention. The transmitter 802 is operable to transmit encoded information via a transfer medium 806 as is known in the art. The encoded data is received from transfer medium 806 by receiver 804. Receiver 804 incorporates a data processing system with transition based equalization. Such a data processing system with transition based equalization may be implemented consistent with the circuits and methods disclosed in FIGS. 1-6.

It should be noted that the various blocks discussed in the above application may be implemented in integrated circuits along with other functionality. Such integrated circuits may include all of the functions of a given block, system or circuit, or a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the present invention provides novel systems, devices, methods and arrangements for data processing with transition based equalization. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system comprising:
   at least one equalizer circuit operable to equalize data according to a control parameter input; and
   a transition state detection circuit operable to detect whether each pair of bits in the data contains a transition and to select among a plurality of control parameters for the control parameter input, wherein the plurality of control parameters are adapted to different operating characteristics.

2. The data processing system of claim 1, wherein the at least one equalizer circuit comprises a digital finite impulse response filter, wherein equalizing data comprises filtering data.

3. The data processing system of claim 1, further comprising an analog to digital converter operable to convert an analog input to a series of digital samples, wherein the at least one equalizer circuit is operable to equalize the digital samples.

4. The data processing system of claim 3, further comprising a data detector circuit operable to detect values of the digital samples, wherein the transition state detection circuit is operable to detect whether each pair of bits in the data contains a transition based at least in part on the detected values from the data detector circuit.

5. The data processing system of claim 4, wherein the transition state detection circuit is operable to analyze probabilities of values based on soft information in the detected values from the data detector circuit to detect a transition.

6. The data processing system of claim 5, further comprising a frontend equalizer operable to equalize the digital samples before the data detector circuit detects the values, wherein the frontend equalizer uses tap coefficients trained for data containing both transitions and non-transitions.

7. The data processing system of claim 4, wherein the transition state detection circuit is operable to detect a transition based on hard decisions in the detected values from the data detector circuit.

8. The data processing system of claim 4, wherein the data detector circuit is symbol based, and wherein the transition state detection circuit is operable to detect a transition based on symbol value probabilities in soft information in the detected values from the data detector circuit.

9. The data processing system of claim 1, wherein the plurality of control parameters comprise tap coefficients, wherein one of the plurality of tap coefficients is adapted to filter data with transitions, and wherein another of the plurality of tap coefficients is adapted to filter data without transitions.

10. The data processing system of claim 1, wherein the at least one equalizer circuit comprises one equalizer circuit with selectable tap coefficients, wherein a first selectable tap coefficient is adapted for transition data and a second selectable tap coefficient is adapted for non-transition data.

11. The data processing system of claim 1, wherein the at least one equalizer circuit comprises a first equalizer circuit with tap coefficients adapted for transition data and a second equalizer circuit with tap coefficients adapted for non-transition data, further comprising multipliers operable to scale outputs from the first equalizer circuit and second equalizer circuit and a combining circuit operable to combine outputs of the multipliers to yield an equalized output.

12. The data processing system of claim 1, further comprising a backend data detector circuit operable to detect values of an equalized output from the at least one equalizer circuit, and a data decoder circuit operable to decode an output of the backend data detector circuit.

13. The data processing system of claim 1, wherein the at least one equalizer circuit and the transition state detection circuit are incorporated in a storage device.

14. The apparatus of claim 13, wherein the storage device comprises:
   a storage medium maintaining a data set; and
   a read/write head assembly operable to sense the data set on the storage medium and to provide an analog output corresponding to the data set, wherein the at least one equalizer circuit is operable to equalize a signal derived from the analog output.

15. The apparatus of claim 1, wherein the apparatus is incorporated in a data transmission device.

16. A method for processing data comprising:
   applying a data detection algorithm to detect values in a stream of digital data;
   determining whether a pair of bits in the stream of digital data contains a transition;
   selecting tap coefficients based at least in part on whether the pair of bits contains a transition; and
   filtering the stream of digital data using the tap coefficients.

17. The method of claim 16, wherein selecting the tap coefficients comprises updating the selection each bit in the stream of digital data.

18. The method of claim 16, wherein selecting tap coefficients and filtering the stream of digital data comprises:
   filtering the stream of digital data in a first equalizer with first tap coefficients adapted to data with a transition;
   filtering the stream of digital data in a second equalizer with second tap coefficients adapted to data with a non-transition; and
   combining an output of the first equalizer and a second equalizer in scaled fashion based on whether the pair of bits in the stream of digital data contains a transition.

19. The method of claim 16, further comprising sampling an analog signal to yield digital samples, equalizing the digital samples in a frontend equalizer to yield the stream of digital data, wherein the frontend equalizer uses tap coefficients adapted to data with both transitions and non-transitions, detecting values of the digital data after the filtering to yield a detected output, and decoding the detected output to yield a data output.

20. A storage system comprising:
   a storage medium maintaining a data set;
   a read/write head assembly operable to provide an analog signal based on the data set on the storage medium;
   an analog to digital converter operable to sample the analog signal to provide a series of data samples;
   a frontend equalizer operable to filter the data samples to yield filtered data samples;
   a data detector operable to detect values in the filtered data samples;
   a transition detector circuit operable to determine whether a pair of bits in an output of the data detector has a transition; and
   a backend equalizer operable to equalize the series of data samples using tap coefficients that are varied based on whether the pair of bits in the output of the data detector has a transition.

* * * * *